US009383072B2

(12) United States Patent
Macor

(10) Patent No.: US 9,383,072 B2
(45) Date of Patent: Jul. 5, 2016

(54) COMPACT PORTABLE LIGHTING DEVICE

(71) Applicant: Richard J Macor, Asbury, NJ (US)

(72) Inventor: Richard J Macor, Asbury, NJ (US)

(73) Assignee: Proprietary Technologies, Inc., Hunterdon County, NJ (US)

( * ) Notice: Subject to any disclaimer, the term of this patent is extended or adjusted under 35 U.S.C. 154(b) by 0 days.

(21) Appl. No.: 14/545,644

(22) Filed: Jun. 2, 2015

(65) Prior Publication Data

US 2015/0316220 A1 Nov. 5, 2015

Related U.S. Application Data

(63) Continuation-in-part of application No. 13/815,073, filed on Jan. 29, 2013, now abandoned.

(51) Int. Cl.
| F21L 4/02 | (2006.01) |
| F21V 21/14 | (2006.01) |
| F16B 7/04 | (2006.01) |
| F21L 2/00 | (2006.01) |
| F21W 111/10 | (2006.01) |

(52) U.S. Cl.
CPC ............... F21L 4/022 (2013.01); F16B 7/0433 (2013.01); F21L 2/00 (2013.01); F21V 21/145 (2013.01); *F21W 2111/10* (2013.01); *Y10T 403/3906* (2015.01)

(58) Field of Classification Search
CPC .................. F21L 4/02; F21L 2/00; F16B 7/04
USPC .......... 362/396, 154, 457, 382, 180, 191, 190, 362/184, 192
See application file for complete search history.

(56) References Cited

U.S. PATENT DOCUMENTS

| 1,448,353 | A | * | 3/1923 | Barany | .................... | F21L 4/022 340/321 |
| 1,875,956 | A | * | 9/1932 | Thiel | .................... | F21L 7/00 362/184 |
| 2,434,440 | A | * | 1/1948 | Schafranck | ............. | F21L 15/08 248/106 |
| 2,966,580 | A | * | 12/1960 | Taylor | ....................... | F21L 4/00 200/60 |
| 5,010,454 | A | * | 4/1991 | Hopper | .................. | B60Q 3/007 362/183 |
| 6,851,824 | B2 | * | 2/2005 | Hsien | ..................... | B25B 23/18 362/119 |
| 7,337,577 | B1 | * | 3/2008 | Ramirez | ............. | A01K 97/125 362/120 |
| 8,087,797 | B2 | * | 1/2012 | Pelletier | .................... | F21L 2/00 362/190 |

* cited by examiner

*Primary Examiner* — Anabel Ton

(57) ABSTRACT

A compact, portable lighting device which has a support component and a plurality of lighting components. The support component has a plurality of lighting component receivers. Each of the receivers has a back and a front, and a plurality of contacting positions to simultaneously contact and hold a lighting component. Each of the receivers has a focal point of the plurality of contact positions that is a straight central axis. The lighting components are separate components from the support component and separate components from one another. Each of the lighting components has an elongated section with a straight central axis and a front end with illumination elements. And, each of the lighting components is positioned within one or more of the receivers with its central axis being coincidental with the central axis of the one or more of the receivers.

20 Claims, 9 Drawing Sheets

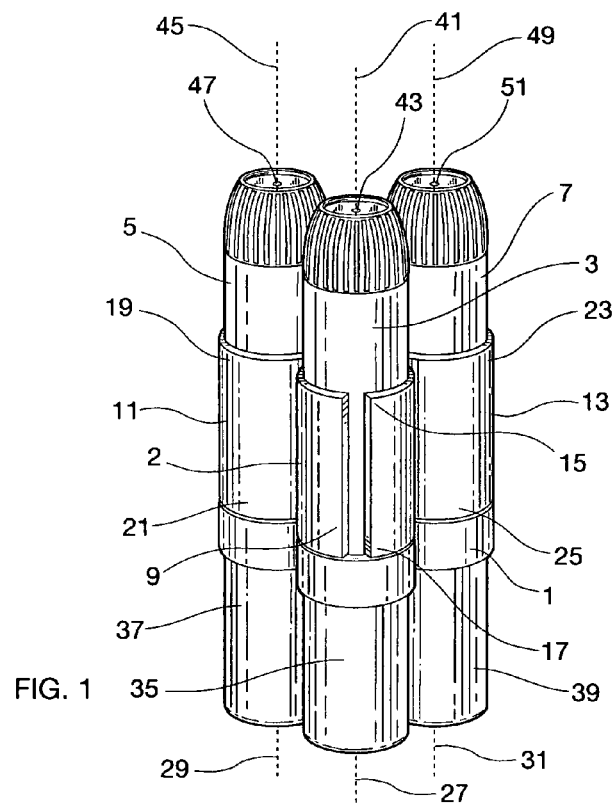
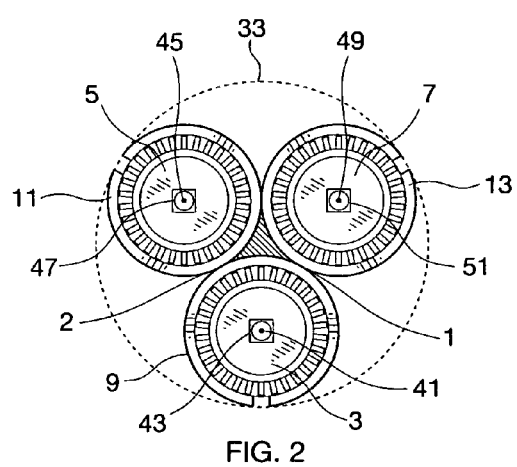
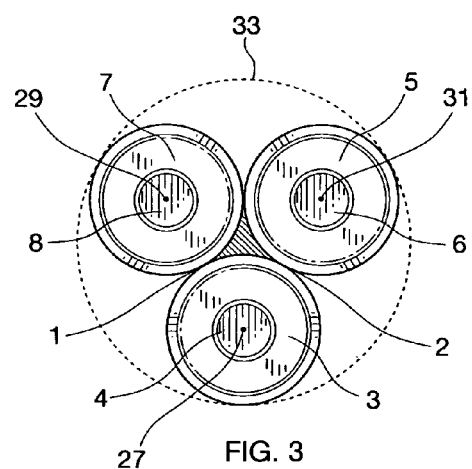

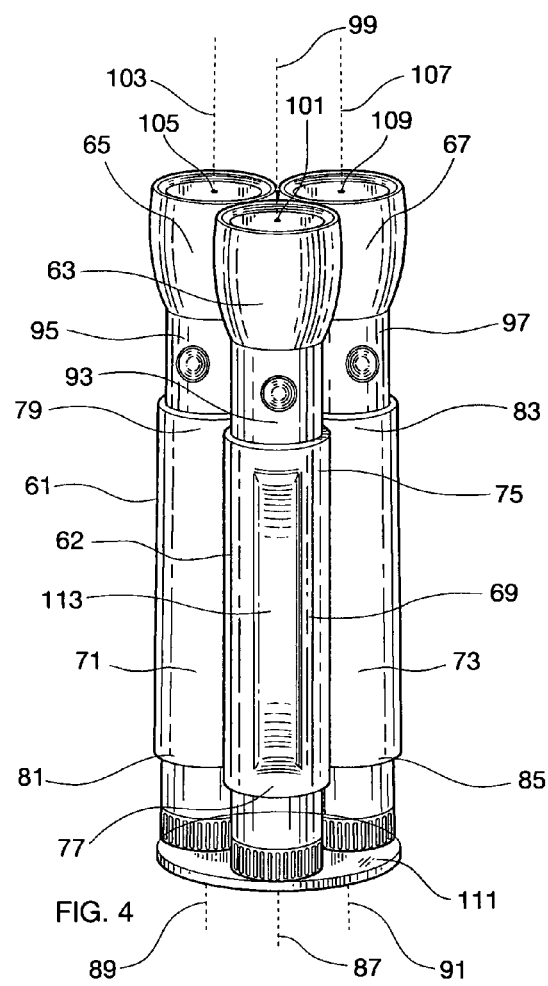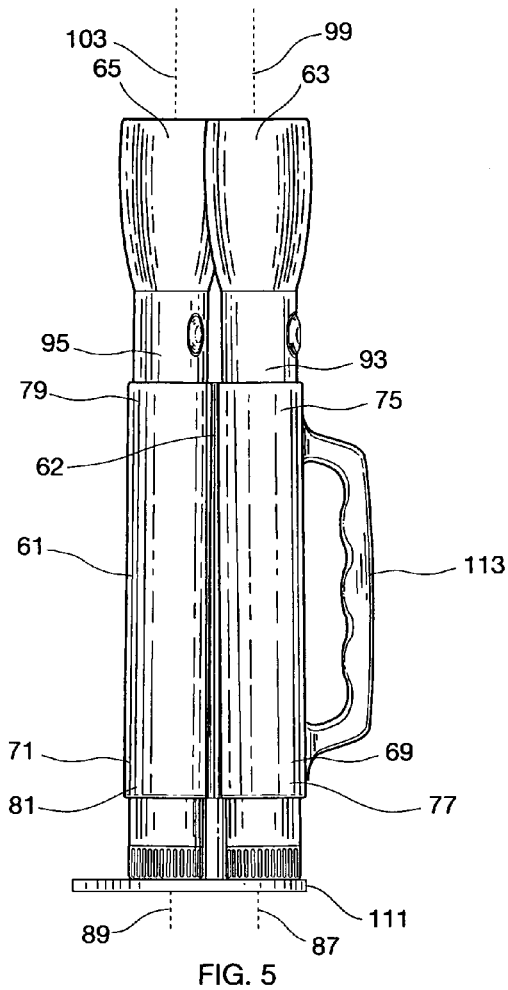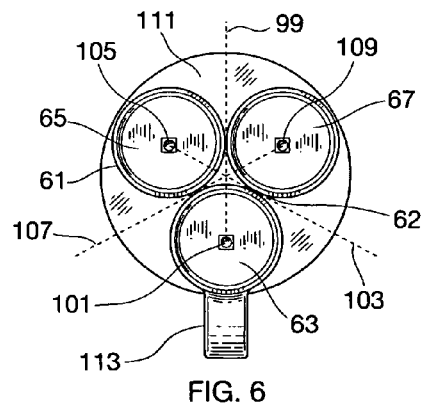

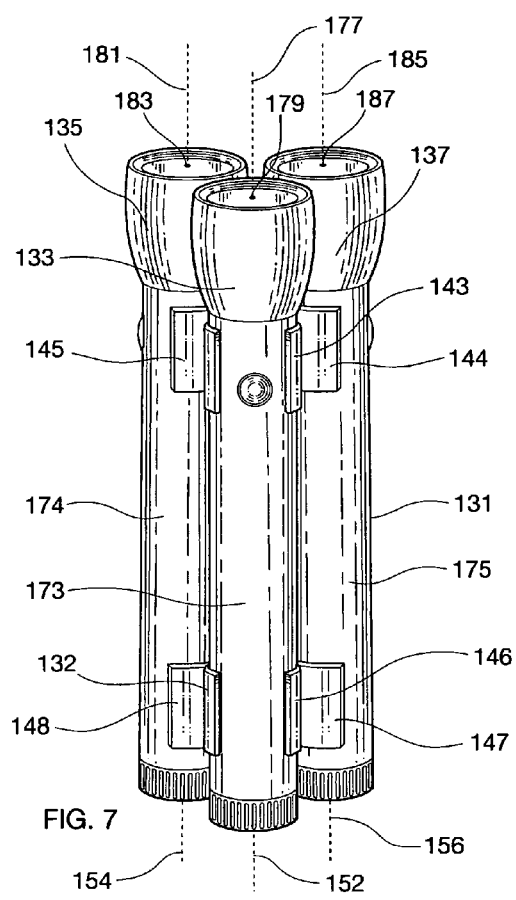
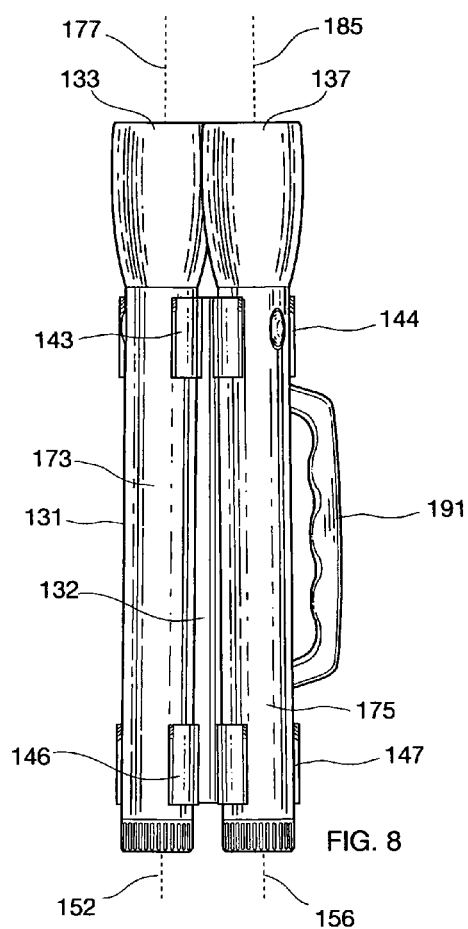
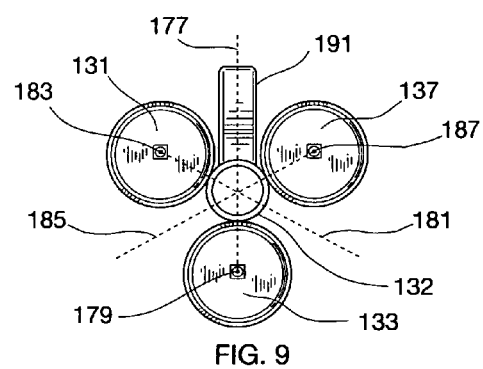
FIG. 7
FIG. 8
FIG. 9

COMPACT PORTABLE LIGHTING DEVICE

REFERENCES TO RELATED APPLICATIONS

This application relates to, and is a continuation-in-part of copending U.S. patent application Ser. No. 13/815,073, filed on Jan. 29, 2013 entitled PORTABLE LIGHTING DEVICE, also filed by the inventor herein.

FIELD OF THE INVENTION

The present invention relates to portable lighting devices including flashlights, lanterns, and the like. More specifically, the present invention relates to portable lighting devices having a plurality of independently operational lighting components.

BACKGROUND OF THE INVENTION

Portable lighting devices including flashlights, lanterns and the like have been around for many years and continue to evolve with recent improvements including LED and Lithium Ion technologies, etc. Considering the many improvements in portable lighting devices over the years, there are still many areas where these devices can be improved. The inventor herein contemplates a portable lighting device that can provide two or more times the battery life, two or more times the illumination power, and, enhanced versatility over conventional, prior art portable lighting devices.

SUMMARY OF THE INVENTION

A compact, portable lighting device which has a support component and a plurality of lighting components. The support component has a plurality of lighting component receivers. Each of the receivers has a back and a front, and a plurality of contacting positions to simultaneously contact and hold a lighting component. Each of the receivers has a focal point of the plurality of contact positions that is a straight central axis. The lighting components are separate components from the support component and separate components from one another. Each of the lighting components has an elongated section with a straight central axis and a front end with illumination elements. And, each of the lighting components is positioned within one or more of the receivers with its central axis being coincidental with the central axis of the one or more of the receivers.

It is an objective of the present invention described herein that it provides two or more times the battery life than a conventional prior art, portable lighting device.

It is another objective of the present invention that it provides two or more times the illumination power and intensity than a conventional prior art, portable lighting device.

It is another objective of the present invention that some embodiments provide for the convergence of a plurality of light beams from a plurality of lighting components to increase the illumination power and intensity.

It is another objective of the present invention that some embodiments provide for adjustability of the convergence of a plurality of light beams, to provide for a plurality of points of convergence.

It is another objective of the present invention that it provides two or more times the versatility than a conventional prior art, portable lighting device.

It is another objective of the present invention that it provides two or more users, simultaneously, each with their own independently operational portable lighting device.

And, it is another objective of the present invention that it is commercially viable, simple in design, and cost-efficient to manufacture.

BRIEF DESCRIPTION OF THE DRAWINGS

The present invention is more fully understood when the specification herein is taken in conjunction with the drawings appended hereto, wherein:

FIG. 1 shows a front perspective elevation view of one example embodiment of a compact portable lighting device having three lighting components; and, FIG. 2 shows a top view of the compact portable lighting device shown in FIG. 1; and, FIG. 3 shows a back view of the compact portable lighting device shown in FIGS. 1 and 2; and, FIG. 4 shows a front perspective elevation view of another example embodiment of a compact portable lighting device having three lighting components and a handle; and, FIG. 5 shows a left side elevation view of the compact portable lighting device shown in FIG. 4; and, FIG. 6 shows a top view of the compact portable lighting device shown in FIGS. 4 and 5; and, FIG. 7 shows a front perspective elevation view of another example embodiment of a compact portable lighting device having three lighting components and a handle; and, FIG. 8 shows a right side elevation view of the compact portable lighting device shown in FIG. 7; and, FIG. 9 shows a top view of the compact portable lighting device shown in FIGS. 7 and 8; and, FIG. 10 shows a front perspective elevation view of another example embodiment of a compact portable lighting device having two lighting components; and, FIG. 11 shows a top view of the compact portable lighting device shown in FIG. 10; and, FIG. 12 shows a back view of the compact portable lighting device shown in FIGS. 10 and 11 with the lighting components separated from the receivers; and, FIG. 13 shows a front perspective elevation view of another example embodiment of a compact portable lighting device having three lighting components and torch-like handle; and, FIG. 14 shows a front perspective elevation view of another example embodiment of a compact portable lighting device having two lighting components and pistol-like handle; and, FIG. 15 shows three light beams at a predetermined point of convergence with each light beam having a center axis; and, FIG. 16 shows the center axes of three light beams shown in FIG. 15 converging at a predetermined point of convergence whereby the illumination power and intensity is increased threefold.

DETAILED DESCRIPTION OF THE DRAWINGS

Figure 10:
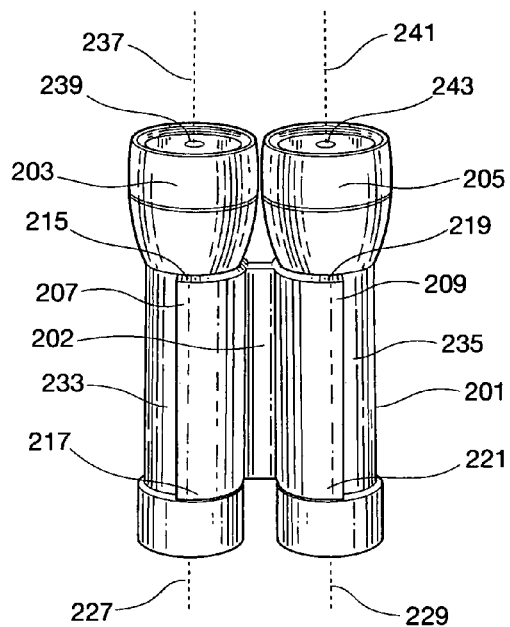

The various drawings provided herein are for the purpose of illustrating examples of the present invention and not for the purpose of limiting same. Therefore, the drawings herein represent only a few of the many possible examples, embodiments, variations and/or applications of the present invention.

FIGS. 1, 2 and 3 together show a front perspective elevation view; a top view; and a bottom view respectively of an example embodiment of a compact portable lighting device 1. Compact, portable lighting device 1 has a support component 2 and a plurality of lighting components 3, 5 and 7 which are LED flashlights, however, lighting components 3, 5, and 7 could very well be any device producing a light beam of any wave length or frequency including LED, incandescent, laser, etc. Support component 2 has a plurality of lighting component receivers 9, 11 and 13. A lighting component receiver shall be defined herein as a component of the support component structured with a cavity or opening formed to detachably hold a lighting component (or part of a lighting component if there's a plurality of receivers holding one lighting component.) Support component 2 has a back (or rear end) shown in FIG. 3, and a front (or front end) shown in FIG. 2. Lighting components 3, 5, and 7 have switch push-buttons 4, 6, and 8 respectively, seen best in FIG. 3. Each switch push button is used to turn on or turn off a lighting component independent from the others. Each of the receivers 9, 11, and 13 also have a back and a front wherein receiver 9 has a front 15 and a back 17; and, receiver 11 has a front 19 and a back 21; and, receiver 13 has a front 23 and a back 25. Each of the receivers 9, 11 and 13 have a plurality of internal contacting positions to simultaneously contact and hold a lighting component. Receiver 9 is a plastic, semi-flexible "C" shaped receiving structure formed to hold lighting component 3. Lighting component 3 is slid from the back to the front into receiver 9, slightly expanding receiver 9 whereby a plurality of internal contact positions simultaneously contact and firmly hold lighting component 3 in receiver 9. This is the same for receivers 11 and 13 holding lighting components 5 and 7 respectively. Each receiver has a focal point created by the plurality of contact positions which is a straight central axis. Accordingly, receiver 9 has a focal point defined by straight central axis 27, and receiver 11 has a focal point defined by straight central axis 29, and receiver 13 has a focal point defined by straight central axis 31.

In some embodiments of the present invention such as portable lighting device 1, the support component 2 has a maximum periphery when viewed from a back view thereof. This maximum periphery is the smallest circle 33 encompassing the support component 2 and tangent to at least two outer points of the support component as seen in the back view of FIG. 3 (as well as the front view of FIG. 2.) Each of at least two of the plurality of lighting component receivers is positioned proximate to the other and proximate to the maximum periphery circle 33 of the support component 2 as seen in FIGS. 2 and 3. In this embodiment of the present invention, receivers 9, 11, and 13 are not only proximate to maximum periphery circle 33 but each are actually touching or tangent to circle 33 as seen in FIGS. 2 and 3. Accordingly, in some embodiments of the present invention each of at least two of the plurality of lighting component receivers is positioned proximate to the other and proximate to the maximum periphery circle of the support component; yet in some other embodiments of the present invention, each of the at least two of the plurality of lighting component receivers is positioned proximate to the other, and, tangent to the maximum periphery circle. In smaller portable lighting devices such as that shown here in FIGS. 1, 2, and 3, a user would simply hold the lighting device grasping the bundle of lighting components. In larger versions of the present invention wherein the bundle of lighting components is too wide for a user to easily grasp, a handle is connected to the support component to better facilitate hand held operation and usage.

The plurality of lighting components 3, 5 and 7 are separate components from support component 2 and separate components from one another. Each of the plurality of lighting components has an elongated section, whereas lighting component 3 has elongated section 35; and, lighting component 5 has elongated section 37; and, lighting component 7 has elongated section 39. Each elongated section of each lighting component has a straight central axis with illumination elements whereas elongated section 35 of lighting component 3 has a straight central axis 41 and illumination elements 43; and, elongated section 37 of lighting component 5 has a straight central axis 45 and illumination elements 47; and, elongated section 39 of lighting component 7 has a straight central axis 49 and illumination elements 51.

Each of the plurality of lighting components 3, 5 and 7 is positioned within a receiver such that the straight central axis of the elongated section of each lighting component is coincidental with the straight central axis of the receiver as shown. Accordingly, straight central axis 41 of lighting component 3 is coincidental with the straight central axis 27 of receiver 9; and, the straight central axis 45 of lighting component 5 is coincidental with the straight central axis 29 of receiver 11; and, the straight central axis 49 of lighting component 7 is coincidental with the straight central axis 31 of receiver 13. The present invention is structured as shown and described so a user may remove and insert one or more of the plurality of lighting components 3, 5, and 7, from and to one or more of the receivers 9, 11, and 13; and, may illuminate each of the plurality of lighting components separately. This provides for a compact, portable lighting device 1 with an illumination power that is two or three times greater than that of just a single lighting component (such as lighting component 3 for example) depending upon whether two or three flashlights are turned on simultaneously. In addition, when a plurality of lighting components are joined together by a support component as shown, the portable lighting device is more stabile than a single lighting component (such as lighting component 3 for example) when set upon a flat surface for use as a lantern. Accordingly, compact portable lighting device 1 may be rested standing up and used as a lantern with three times the illumination power of a single lighting component (such as lighting component 3 for example) when three of the lighting components 3, 5, and 7 are turned on simultaneously. In addition, compact, portable lighting device 1 can extend total battery life by three times that of a single lighting component (such as lighting component 3 for example), if each of lighting components 3, 5, and 7 is used separately until their battery life is spent.

In some preferred embodiments of the present invention, there are three lighting components. In other preferred embodiments of the present invention, there are only two lighting components. Yet in other embodiments of the present invention there could be four, or more lighting components. In addition, when the present invention comprises at least three lighting components, the lighting components are preferably arranged in a predetermined pattern selected from the group consisting of parallel and polygonal. As seen in FIGS.

1, 2, and 3 the lighting components 3, 5, and 7 are arranged in a predetermined polygonal pattern as shown.

FIGS. 4, 5, and 6 together show a front perspective elevation view; a left side elevation view, and a top view respectively of another example embodiment of a compact portable lighting device 61. Compact, portable lighting device 61 has a support component 62 and a plurality of lighting components 63, 65, and 67 which are LED flashlights, however, lighting components 63, 65, and 67 could very well be any portable device producing a light beam of any wave length or frequency including LED, incandescent, laser, etc. Support component 62 has a plurality of lighting component receivers 69, 71, and 73. A lighting component receiver shall be defined herein as a component of the support component structured with a cavity or opening formed to detachably hold a lighting component (or part of a lighting component if there's a plurality of receivers holding one lighting component.) Each of receivers 69, 71, and 73 has a back and a front, wherein, receiver 69 has a front 75 and a back 77; and, receiver 71 has a front 79 and a back 81; and, receiver 73 has a front 83 and a back 85. Each of the receivers 69, 71, and 73 has a plurality of internal contacting positions to simultaneously contact and hold a lighting component. Receiver 69 is a semi-elastic plastic tube structured to frictionally hold lighting component 63. Lighting component 63 is slid in through the front 75 and down to the back 77 of receiver 69 whereby a plurality of internal contact positions simultaneously contact and firmly hold lighting component 63 in receiver 69. This is the same for receivers 71 and 73 holding lighting components 65 and 67 respectively. Each receiver has a focal point created by the plurality of contact positions which is a straight central axis. Accordingly, receiver 69 has a focal point defined by straight central axis 87; and, receiver 71 has a focal point defined by straight central axis 89; and, receiver 73 has a focal point defined by straight central axis 91.

The plurality of lighting components 63, 65, and 67 are separate components from support component 62 and separate components from one another. Each of the plurality of lighting components has an elongated section, whereas lighting component 63 has elongated section 93; and, lighting component 65 has elongated section 95; and, lighting component 67 has elongated section 97. Each elongated section of each lighting component has a straight central axis with illumination elements whereas elongated section 93 of lighting component 63 has a straight central axis 99 and illumination elements 101; and, elongated section 95 of lighting component 65 has a straight central axis 103 and illumination elements 105; and, elongated section 97 of lighting component 67 has a straight central axis 107 and illumination elements 109. Each of the plurality of lighting components 63, 65, and 67 is positioned within a receiver such that the straight central axis of the elongated section of each lighting component is coincidental with the straight central axis of the receiver as shown. Accordingly, straight central axis 99 of lighting component 63 is coincidental with the straight central axis 87 of receiver 69; and, the straight central axis 103 of lighting component 65 is coincidental with the straight central axis 89 of receiver 71; and, the straight central axis 107 of lighting component 67 is coincidental with the straight central axis 91 of receiver 73. And, in this embodiment of the present invention the central axes 99, 103, and 107 of lighting components 63, 65, and 67 respectively, are nonparallel to one another and converge at a predetermined point of convergence when viewed from back to front. This is accomplished by forming support component 62 with the front end of each of its receivers tilting slightly inward towards the other lighting components. This provides portable lighting device 61 with double or triple the illumination power and intensity of a single lighting component (such as just lighting component 63 for example) when two or three of the lighting components are turned on at the same time.

Compact portable lighting device 61 is structured as shown and described so a user may remove and insert one or more of the plurality of lighting components 63, 65, and 67 from and to one or more of the receivers 69, 71, and 73; and, may illuminate each of the plurality of lighting components separately. In addition, portable lighting device 61 has a base 111 providing additional stability for portable lighting device 61 to be stood up for use as a lantern. Accordingly, compact portable lighting device 61 may be rested standing up on a surface and used as a lantern with the capability of three times the illumination power of a single lighting component (such as lighting component 63 for example) if all three of the lighting components 63, 65, and 67 are turned on simultaneously. In addition, compact, portable lighting device 61 can extend total battery life by three times that of a single lighting component (such as lighting component 63 for example), if each of lighting components 63, 65, and 67 is used separately until their battery life is spent. In this embodiment of the present invention, support component 62 has a handle 113. In larger versions of the present invention wherein the bundle of lighting components is too wide for a user to easily grasp, a handle is connected to the support component to better facilitate hand held operation and usage.

In some preferred embodiments of the present invention, there are three lighting components. In other preferred embodiments of the present invention, there are only two lighting components. Yet in other embodiments of the present invention there could be four, or more lighting components. In addition, when the present invention comprises at least three lighting components, the lighting components are preferably arranged in a predetermined pattern selected from the group consisting of parallel and polygonal. As seen in FIGS. 4, 5, and 6, the lighting components 63, 65, and 67 are arranged in a predetermined polygonal pattern as shown.

FIGS. 7, 8, and 9 together show a front perspective elevation view; a left side elevation view, and a top view respectively of another example embodiment of a compact portable lighting device 131. Compact, portable lighting device 131 has a support component 132 and a plurality of lighting components 133, 135 and 137 which are LED flashlights, however, lighting components 133, 135, and 137 could very well be any portable device producing a light beam of any wave length or frequency including LED, incandescent, laser, etc. Support component 132 has a plurality of lighting component receivers 143, 144, 145, 146 and 147 and 148. A lighting component receiver shall be defined herein as a component of the support component structured with a cavity or opening formed to detachably hold a lighting component (or part of a lighting component which is the case in this embodiment of the present invention.) Each of the receivers 143, 144, 145, 146, 147, and 148 has a back and a front, wherein the front of each receiver is closer to the illumination elements of the lighting components. In this embodiment of the present invention, all the receivers are semi-elastic, ABS type plastic "C" shaped structures that open up slightly to accept a lighting component which is then held by the living tension of the receiver. "Living tension" is defined herein as the tension or force created during which an object (such as the receivers) resists deformation of its original shape.

Accordingly, lighting component 133 is snapped into and held by receivers 143 and 146 as shown; and, lighting component 135 is snapped into and held by receivers 145 and 148; and, lighting component 137 is snapped into and held by receivers 144 and 147. Each of the receivers 143, 144, 145, 146, 147, and 148 have a plurality of internal contacting positions to simultaneously contact and hold a lighting component firmly in place. Each receiver has a focal point created by the plurality of contact positions which is a straight central axis. Accordingly, receivers 143 and 146 have a common focal point defined by straight central axis 152; and, receivers 144 and 147 have a common focal point defined by straight central axis 156; and, receivers 145 and 148 have a common focal point defined by straight central axis 154.

The plurality of lighting components 133, 135, and 137 are separate components from support component 132 and separate components from one another. Each of the plurality of lighting components has an elongated section whereas lighting component 133 has elongated section 173; and, lighting component 135 has elongated section 174; and, lighting component 137 has elongated section 175. Each elongated section of each lighting component has a straight central axis with illumination elements whereas elongated section 173 of lighting component 133 has a straight central axis 177 and illumination elements 179; and, elongated section 174 of lighting component 135 has a straight central axis 181 and illumination elements 183; and, elongated section 175 of lighting component 137 has a straight central axis 185 and illumination elements 187. Each of the plurality of lighting components 133, 135, and 137 is positioned within two receivers as shown such that the straight central axis of the elongated section of each lighting component is coincidental with the straight central axis of both of the two receivers holding the lighting component. Accordingly, straight central axis 177 of lighting component 133 is coincidental with the straight central axis 152 which is common to both receivers 143 and 146 holding lighting component 133; and, the straight central axis 181 of lighting component 135 is coincidental with the straight central axis 154 which is common to both receivers 145 and 148 holding lighting component 135; and, the straight central axis 185 of lighting component 137 is coincidental with the straight central axis 156 which is common to both receivers 144 and 147 holding lighting component 137. And, in this embodiment of the present invention the central axes 177, 181, and 185 of lighting components 133, 135, and 137 respectively, are nonparallel to one another and converge at a predetermined point of convergence when viewed from back to front. This is accomplished by forming support component 132 so that the straight central axes of the receivers tilt slightly inward at the front of the portable lighting device and towards each other. This provides portable lighting device 131 with the capability of double or triple the illumination power and intensity of a single lighting component (such as just lighting component 133 for example) when two or three of the lighting components are turned on at the same time.

Compact portable lighting device 131 is structured as shown and described so a user may remove and insert one or more of the plurality of lighting components 133, 135, and 137 from and to one or more of the receivers, and may illuminate each of the plurality of lighting components separately or during the same period of time.

In addition, when a plurality of lighting components are joined together by a support component as shown, the portable lighting device is more stabile than a single lighting component (such as lighting component 133 for example) when set upon a surface for use as a lantern. Accordingly, compact portable lighting device 131 may be rested standing up on a surface and used as a lantern with three times the illumination power of a single lighting component (such as lighting component 133 for example) when three of the lighting components 133, 135, and 137 are turned on simultaneously. In addition, compact, portable lighting device 131 can extend total battery life by three times that of a single lighting component (such as lighting component 133 for example), if each of lighting components 133, 135, and 137 is used separately until its battery life is spent.

In some preferred embodiments of the present invention, there are three lighting components. In other preferred embodiments of the present invention, there are only two lighting components. Yet in other embodiments of the present invention there could be four, or more lighting components. In addition, when the present invention comprises three or more lighting components, the lighting components are preferably arranged in a predetermined pattern selected from the group consisting of parallel and polygonal. As seen in FIGS. 7, 8, and 9, the lighting components 133, 135, and 137 are arranged in a predetermined polygonal pattern as shown.

In this embodiment of the present invention support component 132 of compact portable lighting device 131 has a handle 191. In larger versions of the present invention wherein the bundle of lighting components is too wide for a user to easily grasp, a handle is connected to the support component to better facilitate hand held operation and usage.

Figure 11:
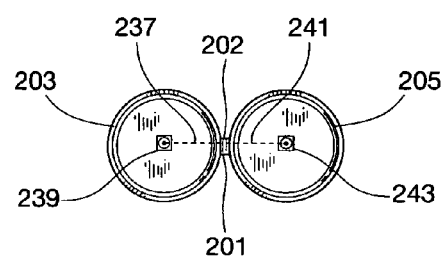
Figure 12:
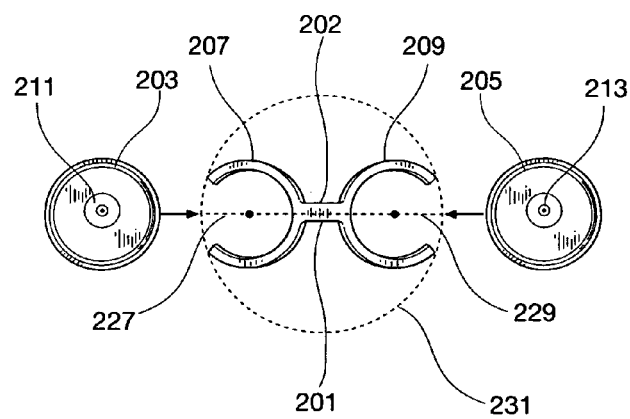

FIGS. 10, 11, and 12 show a front perspective elevation view, a top view, and a back view respectively of another example embodiment of a compact portable lighting device having two lighting components. Compact, portable lighting device 201 has a support component 202 and a plurality of lighting components 203 and 205 which are LED flashlights, however, lighting components 203 and 205 could very well be any portable device producing a light beam of any wave length and/or frequency including LED, incandescent, laser, etc. Support component 202 has a plurality of lighting component receivers 207 and 209. A lighting component receiver shall be defined herein as a component of the support component structured with a cavity or opening formed to detachably hold a lighting component (or part of a lighting component if there's a plurality of receivers holding one lighting component.) Support component 202 has a back (or rear end) shown in FIG. 12. Lighting components 203 and 205 each have switch push-buttons 211 and 213 respectively seen best in FIG. 12. Each switch push button is used to turn on or turn off a lighting component independent from the other. Each of the receivers 207 and 209 has a back and a front wherein receiver 207 has a front 215 and a back 217; and, receiver 209 has a front 219 and a back 221. Each of the receivers 207 and 209 has a plurality of internal contacting positions to simultaneously contact and hold a lighting component. Receiver 207 is a plastic, semi-flexible "C" shaped receiving structure formed to hold lighting component 203. Lighting component 203 is laterally pushed into receiver 207 and snapped into place whereby a plurality of internal contact positions within receiver 207 simultaneously contact and firmly hold lighting component 203 in receiver 207. This is the same for receiver 209 wherein lighting component 205 is laterally pushed into receiver 207 and snapped into place whereby a plurality of internal contact positions within receiver 209 simultaneously contact and firmly hold lighting component 205 in receiver 209. Each receiver has a focal point created by the plurality of contact positions which is a straight central axis. Accordingly, receiver 207 has a focal point defined by straight central axis 227; and, receiver 209 has a focal point defined by straight central axis 229.

In some embodiments of the present invention such as portable lighting device 201, the support component 202 has a maximum periphery 231 when viewed from a back view thereof. The maximum periphery is the smallest circle 231 encompassing the support component 202 and tangent to at least two outer points of the support component as seen in the back view shown in FIG. 12. Each of at least two of the plurality of lighting component receivers is positioned proximate to the other and proximate to the maximum periphery circle 231 of the support component 202 as seen in FIG. 12. In this embodiment of the present invention, receivers 207 and 209 are not only proximate to circle 231 but actually touching or tangent to circle 231 as seen in FIG. 12. Accordingly, in some embodiments of the present invention, each of at least two of the plurality of lighting component receivers is positioned proximate to the other and proximate to the maximum periphery circle of the support component, while in some other embodiments of the present invention, each of the at least two of the plurality of lighting component receivers is positioned proximate to the other, and, tangent to the circle of the maximum periphery. This arrangement provides for a compact portable lighting device formed for hand-held use. In smaller lighting devices such as the one shown here in FIGS. 10, 11, and 12, a user would simply hold the lighting device grasping the bundle of lighting components. A handle is preferable in larger versions of the present invention wherein the bundle of lighting components is too wide for a user to easily grasp.

The plurality of lighting components 203 and 205 are separate components from support component 202 and separate components from one another. Each of the plurality of lighting components has an elongated section, whereas lighting component 203 has elongated section 233; and, lighting component 205 has elongated section 235. Each elongated section of each lighting component has a straight central axis with illumination elements whereas elongated section 233 of lighting component 203 has a straight central axis 237 and illumination elements 239; and, elongated section 235 of lighting component 205 has a straight central axis 241 and illumination elements 243.

Each of the plurality of lighting components 203 and 205 is positioned within a receiver such that the straight central axis of the elongated section of each lighting component is coincidental with the straight central axis of the receiver as shown. Accordingly, straight central axis 237 of lighting component 203 is coincidental with the straight central axis 227 of receiver 207; and, the straight central axis 241 of lighting component 205 is coincidental with the straight central axis 229 of receiver 209. And, in this embodiment of the present invention the central axes 237 and 241 of lighting components 203 and 205 respectively, are nonparallel to one another and converge at a predetermined point of convergence when viewed from back to front. This is accomplished by forming support component 202 so that the straight central axes of the receivers 227 and 229 tilt slightly inward towards each other at the front of the portable lighting device. This provides portable lighting device 201 with the capability of double the illumination power and intensity of a single lighting component (such as just lighting component 203 for example) when both lighting components are turned on at the same time.

The present invention is structured as shown and described so a user may remove and insert one or more of the plurality of lighting components 203 and/or 205 from and to one or more of the receivers 207 and 209; and, may illuminate each of the plurality of lighting components separately. This provides for a compact, portable lighting device 201 with an illumination power that is two times greater than that of just a single lighting component (such as lighting component 203 for example) when both flashlights are turned on simultaneously. In addition, when a plurality of lighting components are joined together by a support component as shown, the portable lighting device is more stabile than a single lighting component (such as lighting component 203 for example) when set upon a surface for use as a lantern. Accordingly, compact portable lighting device 201 may be rested standing up on a surface and used as a lantern with two times the illumination power of a single lighting component (such as lighting component 203 for example) when both lighting components 203 and 205 are turned on simultaneously. In addition, compact, portable lighting device 201 can extend total battery life by two times that of a single lighting component (such as lighting component 203 for example), if each of lighting components 203 and 205 is used separately until its battery life is spent.

In some preferred embodiments of the present invention, there are three lighting components. In other preferred embodiments of the present invention, there are only two lighting components. Yet in other embodiments of the present invention there could be four, or more lighting components.

Figure 13:
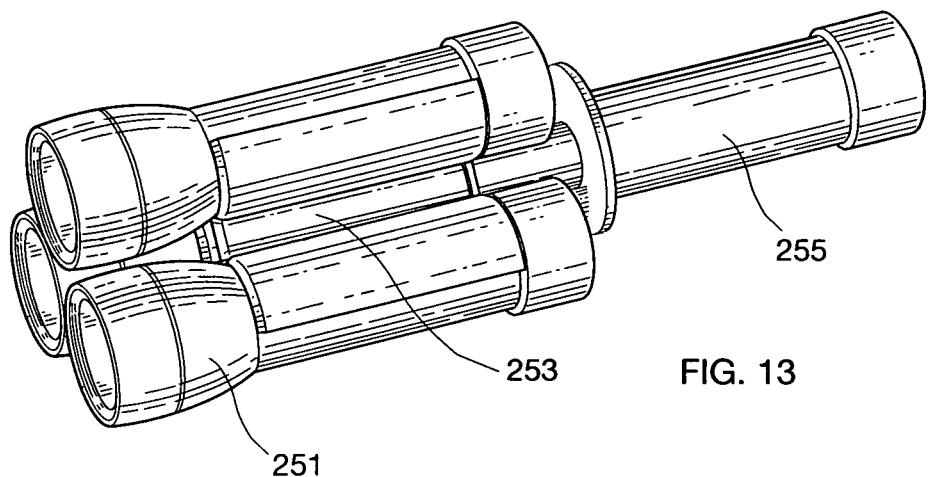

FIG. 13 shows a perspective elevation view of another example embodiment of a compact portable lighting device having three lighting components and a torch-like handle. In this embodiment of the present invention compact portable lighting device 251 has a support component 253 which has a handle 255. A handle is preferable in larger versions of the present invention wherein the width of the support component and plurality of lighting components is too wide for a user to easily grasp with one hand for operation.

Figure 14:
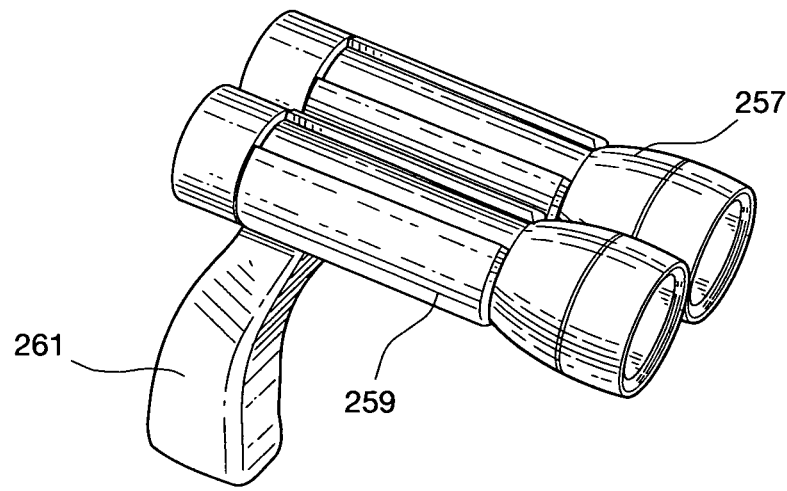

FIG. 14 shows a side perspective elevation view of another example embodiment of a compact portable lighting device having two lighting components and pistol-like handle. In this embodiment of the present invention compact portable lighting device 257 has support component 259 which has a pistol-like handle 261 so a user may point and handle the portable lighting device like a pistol.

Figure 15:
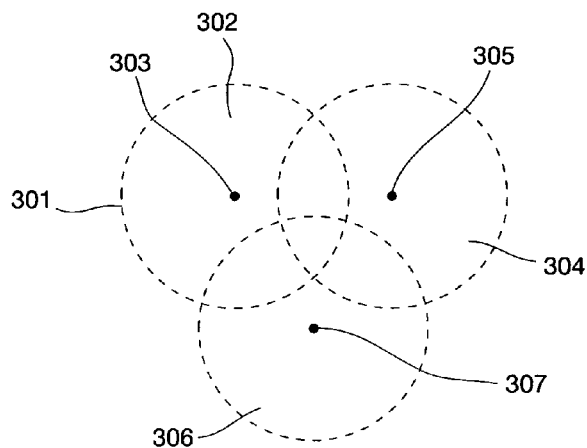

FIG. 15 shows a triangular light beam pattern 301 at a predetermined point of convergence with three light beams 302, 304, and 306 having center axes 303, 305, and 307 respectively. Triangular light beam pattern 301 is an example of a light beam pattern produced by a present invention compact portable lighting device at a predetermined point of convergence. Each of the light beam center axes 303, 305, and 307 is the center of an individual light beam from an individual lighting component, and coincidental with the previously described straight central axis of the elongated section of the lighting component. Such a light beam pattern 301 could be produced by portable lighting device 131, for example, shown in FIGS. 7, 8, and 9, at a predetermined point of convergence, for example.

Figure 16:
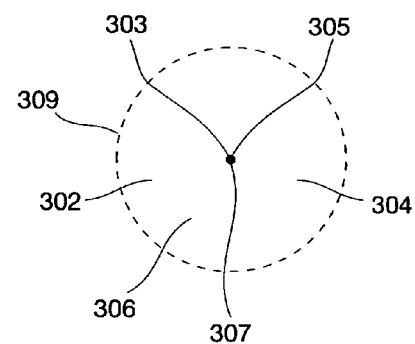

FIG. 16 shows circular shaped light beam 309 as an example of a light beam pattern from the same compact portable lighting device producing the light beam pattern 301 in FIG. 15. Here, light beams 302, 304, and 306 and their respective center axes 303, 305, and 307 achieve full convergence at a predetermined point of convergence or distance, whereby the illumination power and intensity is increased threefold. Full convergence is achieved when all the central axes of all the lighting components (and therefore center axes of the light beams) fully converge and become one, at a predetermined point of convergence or distance when viewed from back to front. Such a light beam pattern 309 could be produced by portable lighting 131, for example, shown in FIGS. 7, 8, and 9 at a predetermined point of convergence.

The point or points of convergence will vary based upon distance. A manufacturer could dictate the distance at which full convergence occurs dependent upon the non-parallel positioning of the central axes of the lighting components when the receivers are fixed. Alternatively, a manufacturer could provide an adjustment mechanism to adjust the nonparallel positioning of the central axes of the lighting components via the support component and receivers, to provide adjustability of the distance and distances at which full convergence of the central axes of the lighting components (and center axes of the light beams) occur.

Figure 17:
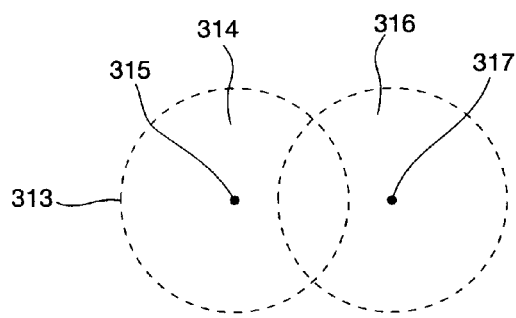
FIG. 17 shows two light beams at a predetermined point of convergence with each light beam having a center axis; and, FIG. 18 shows the center axes of two light beams shown in FIG. 17 converging at a predetermined point of convergence whereby the illumination power and intensity is increased two fold; and, FIG. 19 shows a front perspective elevation view of an example embodiment of a portable lighting device with an adjustment mechanism providing adjustability of one lighting component receiver to another lighting component receiver.

FIG. 17 shows a bi-circular light beam pattern 313 at a predetermined point of convergence with two light beams 314 and 316 having center axes 315 and 317 respectively. Bi-circular light beam pattern 313 is an example of a light beam pattern produced by a present invention portable lighting device at a predetermined point of convergence. Each of the light beam center axes 315 and 317 is the center of an individual light beam from an individual lighting component, and coincidental with the previously described straight central axis of the elongated section of the lighting component. Such a light beam pattern 313 could be produced by portable lighting device 201, for example, shown in FIGS. 10, 11, and 12 at a predetermined point of convergence, for example.

Figure 18:
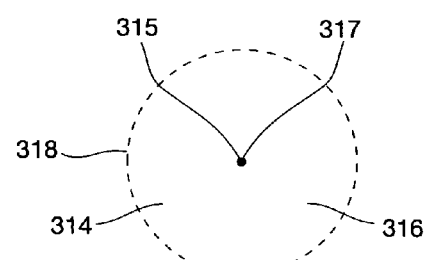

FIG. 18 shows circular shaped light beam 318 as an example of a light beam pattern from the same portable lighting device producing the light beam pattern 313 in FIG. 17. Here, light beams 314 and 316 and their respective center axes 315 and 317 achieve full convergence at a predetermined point of convergence or distance, whereby the illumination power and intensity is increased twofold. Full convergence is achieved when all the central axes of all the lighting components (and center axes of the light beams) fully converge and become one, at a predetermined point of convergence or distance when viewed from back to front. Such a light beam pattern 318 could be produced by portable lighting device 201, for example, shown in FIGS. 10, 11, and 12 at a predetermined point of convergence.

The point or points of convergence will vary based upon distance. A manufacturer could dictate the distance at which full convergence occurs dependent upon the non-parallel positioning of the center axes of the lighting components when the receivers are fixed. Alternatively, a manufacturer could provide an adjustment mechanism to adjust the non-parallel positioning of the center axes of the lighting components via the support component and receivers, to provide adjustability of the distance and distances at which full convergence of the center axes of the lighting components (and center axes of the light beams) occur.

Figure 19:
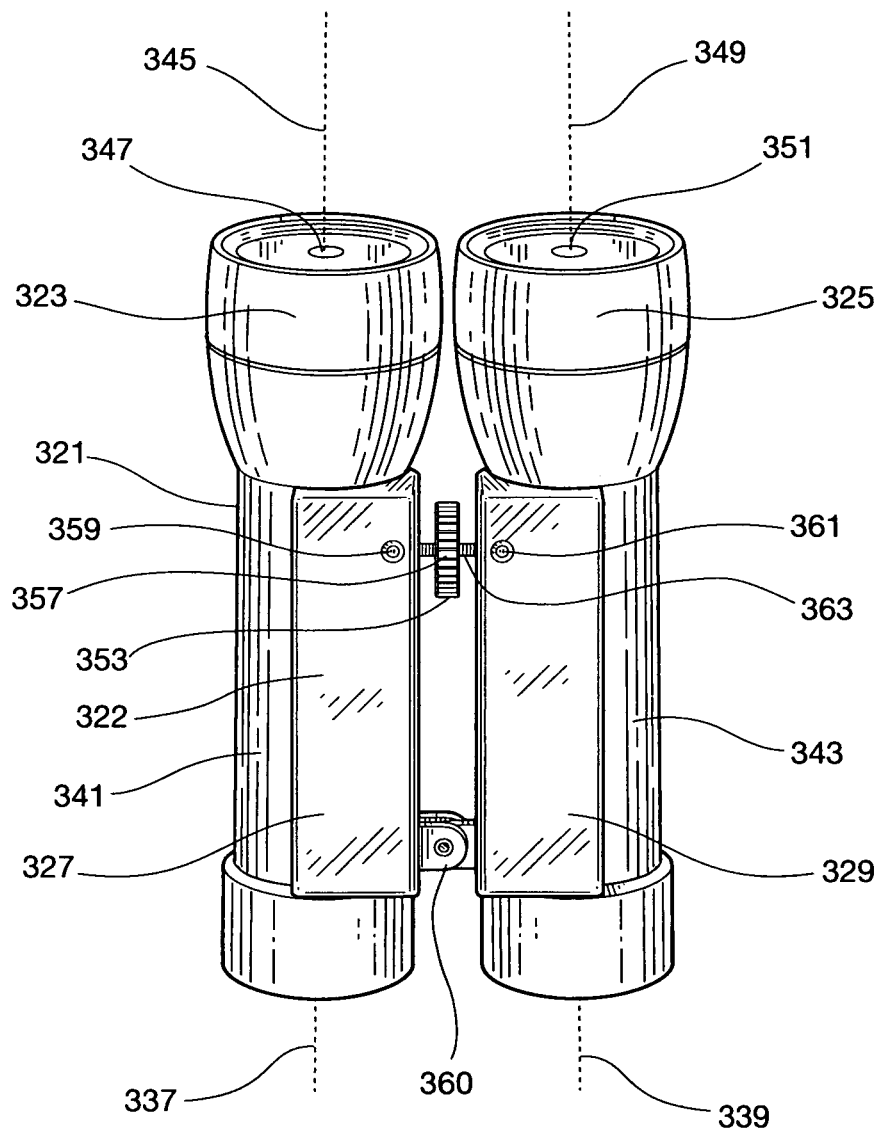

FIG. 19 shows a front perspective elevation view of an example embodiment of a portable lighting device 321. Compact portable lighting device 321 is very similar in design and structure to compact portable lighting device 201 shown in FIGS. 10, 11, and 12, except that compact portable lighting device 321 includes an adjustment mechanism whereby at least one of the receivers is moveable relative to another of the receivers to alter the point of convergence of the central axes of at least two of the plurality of lighting components. In this FIG. 19, compact portable lighting device 321 has support component 322 and a plurality of lighting components 323 and 325 which are LED flashlights, however, lighting components 323 and 325 could very well be any portable device producing a light beam of any wave length and/or frequency including LED, incandescent, laser, etc. Support component 322 has a plurality of lighting component receivers 327 and 329. Each of the receivers 327 and 329 has a plurality of internal contacting positions to simultaneously contact and hold a lighting component. Receiver 327 is a plastic, semi-flexible "C" shaped receiving structure formed to hold lighting component 323. Lighting component 323 is pushed laterally into receiver 327 and snapped into place whereby a plurality of internal contact positions within receiver 327 simultaneously contact and firmly hold lighting component 323 in receiver 327. This is the same for receiver 329 wherein lighting component 325 is pushed laterally into receiver 329 and snapped into place whereby a plurality of internal contact positions within receiver 329 simultaneously contact and firmly hold lighting component 325 in receiver 329. Each receiver has a focal point created by the plurality of contact positions which is a straight central axis. Accordingly, receiver 327 has a focal point defined by straight central axis 337; and, receiver 329 has a focal point defined by straight central axis 339.

The plurality of lighting components 323 and 325 are separate components from support component 322 and separate components from one another. Each of the plurality of lighting components has an elongated section, whereas lighting component 323 has elongated section 341; and, lighting component 325 has elongated section 343. Each elongated section of each lighting component has a straight central axis with illumination elements whereas elongated section 341 of lighting component 323 has a straight central axis 345 and illumination elements 347; and, elongated section 343 of lighting component 325 has a straight central axis 349 and illumination elements 351.

Each of the plurality of lighting components 323 and 325 is positioned within a receiver such that the straight central axis of the elongated section of each lighting component is coincidental with the straight central axis of the receiver as shown. Accordingly, straight central axis 345 of lighting component 323 is coincidental with the straight central axis 337 of receiver 327; and, the straight central axis 349 of lighting component 325 is coincidental with the straight central axis 339 of receiver 329.

The present invention is structured as shown and described so a user may remove and insert one or more of the plurality of lighting components 323 and 325 from and to one or more of the receivers 327 and 329; and, may illuminate each of the plurality of lighting components separately. This provides for a compact, portable lighting device 321 with an illumination power that is two times greater than that of just a single lighting component (such as lighting component 323 for example) when both lighting components are turned on simultaneously. In addition, when a plurality of lighting components are joined together by a support component as shown, the portable lighting device is more stabile than a single lighting component (such as lighting component 323 for example) when set upon a surface for use as a lantern. Accordingly, compact portable lighting device 321 may be rested standing up on a surface and used as a lantern with two times the illumination power of a single lighting component (such as lighting component 323 for example) when both lighting components 323 and 325 are turned on simultaneously. In addition, compact, portable lighting device 321 can extend total battery life by two times that of a single lighting component (such as lighting component 323 for example), if each of lighting components 323 and 325 is used separately until its battery life is spent.

In this example embodiment of the present invention, portable lighting device 321 has an adjustment mechanism 353 whereby at least one of the receivers 327 and/or 329 is moveable relative to another of the receivers to alter the point of convergence of the central axes 345 and 349 of respective lighting components 323 and 325. Accordingly, a user can turn adjustment wheel 357 of adjustment mechanism 353 to alter the point of convergence of central axes 345 and 349. A user could also achieve full convergence of the lighting component center axes 345 and 349 if desired, at any desired distance. Support component 322 also includes a pivoting hinge 360 connecting receivers 327 and 329 at the bottom.

Adjustment mechanism 353 has two threaded studs extending horizontally (in this view) such as threaded stud 363. The threaded studs are threaded into two pivoting internal threaded nuts (not seen in this view) behind pivots 359 and 361, providing for manual rotation of thumbwheel 357 and adjustment of the distance between the two receivers at the upper end of support component 322 as shown.

Figure 20:
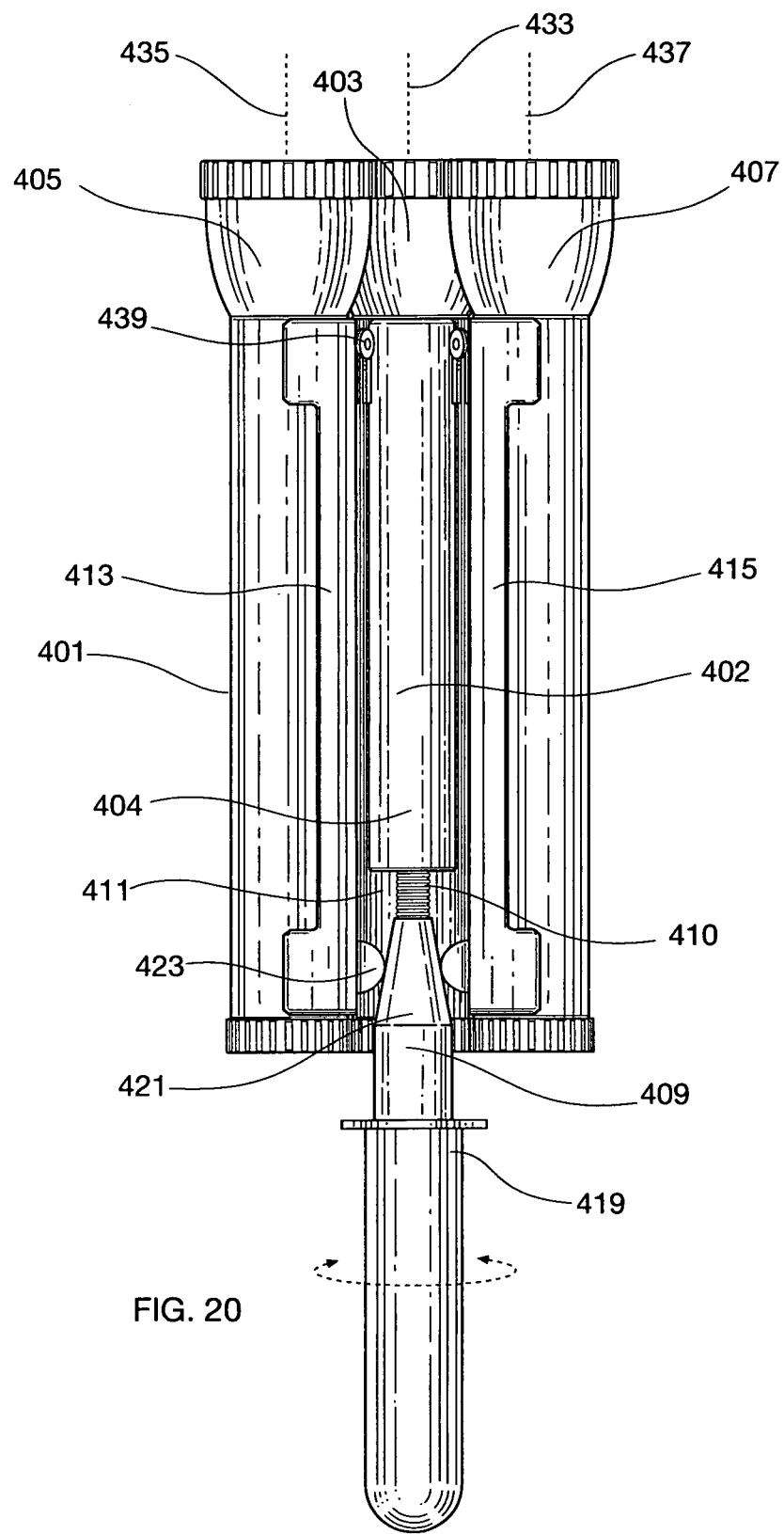
FIG. 20 shows a front elevation view of another example embodiment of a portable lighting device with an adjustment mechanism providing adjustability of three separate lighting components simultaneously, with the same rate and point of convergence of movement.

FIG. 20 shows a front elevation view of an example embodiment of a compact portable lighting device 401. Compact portable lighting device 401 is similar in design and structure to compact portable lighting device 251 shown in FIG. 13, except that compact portable lighting device 401 includes an adjustment mechanism whereby at least one of the receivers is moveable relative to another of the receivers to alter the point of convergence of the central axes of at least two of the plurality of lighting components. In this Figure, compact portable lighting device 401 has a support component 402 and a plurality of lighting components 403, 405, and 407. Portable lighting device 401 has a single controlling adjustment mechanism 409 connected to and engaging with three receivers 411, 413, and 415. When a user rotates handle 419 clockwise or counter-clockwise, threaded component 410 of adjustment mechanism 409 moves upward or downward respectively relative to internally threaded portion 404 of support component 402. Conical component 421 of adjustment mechanism 409 connects and engages with a lobe (such as lobe 423) of each of the three lighting component receivers 411, 413, and 415. Such an arrangement allows adjustment mechanism 409 to adjust the positioning of all three receivers 411, 413, and 415 simultaneously outward or inward with the same rate and point of convergence of movement, relative to support component 402. Accordingly the point of convergence of central axes 433, 435, and 437 may be altered simultaneously with the same rate and point of convergence of movement. Each receiver 411, 413, and 415 is attached to the support component 402 with a spring pivot joint such as spring pivot joint 439. Each spring pivot joint such as spring pivot joint 439, creates constant pressure between each receiver lobe (such as lobe 423) and the conical component 423 of adjustment mechanism 409.

Adjustment mechanism 409 allows a user to adjust the distance at which full convergence occurs. To achieve full convergence at just a few feet or several hundred feet or further, each central axis of each lighting component would preferably be tilted inward towards the center axis or axes of the other lighting component or components by just 3 degrees or so, to as little as a couple tenths of a degree or so. Accordingly, in preferred embodiments of the present invention each central axis of each lighting component would tilt inward towards the other center axis or central axes, of the other lighting component or components, within the range of 2 tenths of a degree (0.02 degree) through 3 degrees (3 degrees) inclusive.

FIGS. 21, 22, 23, 24, 25, 26, 27, 28, and 29 show an end view of the opening or cavity of a few present invention lighting component receivers, for example. In each Figure, the broken lines surrounding the internal opening or cavity depict outer portions of the receiver that may, or may not, extend beyond the broken lines. As described earlier, a lighting component receiver is defined herein as a component of the support component structured with a cavity or opening formed to detachably hold a lighting component (or part of a lighting component). The internal configuration of a lighting component receiver can be almost any shape, whatsoever, including being tubular, circular, polygonal, oval, irregular, symmetrical, asymmetrical, or any combination thereof, for example. In some preferred embodiments of the present invention, the lighting component receivers are selected from the group consisting of (i) a receiver having a plurality of internal flats; (ii) a receiver having a plurality of internal arcs; (iii) a receiver having a semi-flexible C-shaped section; and (iv) a receiver having an internal tubular shape.

Figure 21:
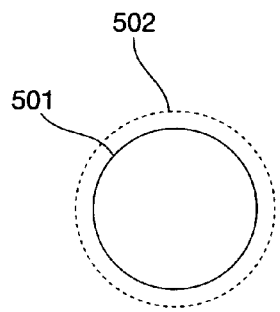
FIGS. 21-29 show just a few of the many possible different lighting component receivers.

FIG. 21 shows a circular or tubular internal configuration 501 inside receiver 502.

Figure 22:
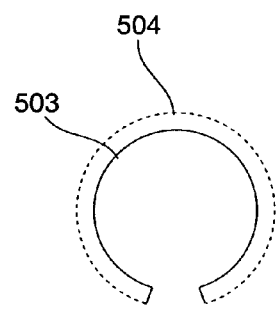

FIG. 22 shows a "C" shaped internal configuration 503 inside receiver 504.

Figure 23:
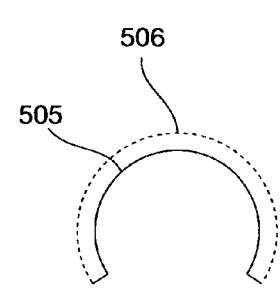

FIG. 23 shows another "C" shaped internal configuration 505 inside receiver 506.

Figure 24:
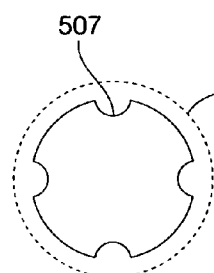

FIG. 24 shows an internal configuration 507 with opposing arcs, inside receiver 508.

Figure 25:
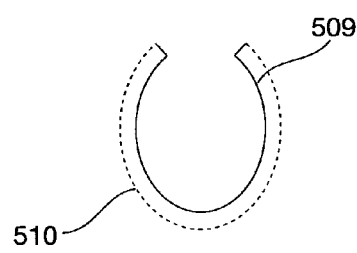

FIG. 25 shows an oval "C" shaped internal configuration 509 inside receiver 510.

Figure 26:
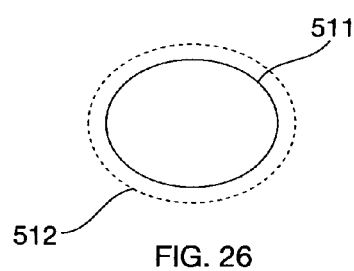

FIG. 26 shows an oval shaped internal configuration 511 inside receiver 512.

Figure 27:
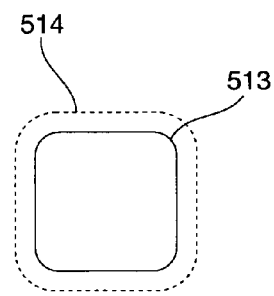

FIG. 27 shows a substantially square shaped internal configuration 513 inside receiver 514.

Figure 28:
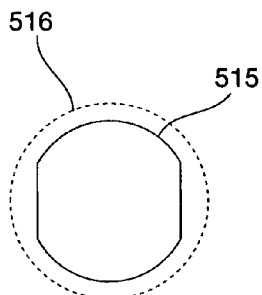

FIG. 28 shows an internal configuration 515 with arced and flat surfaces inside receiver 516.

Figure 29:
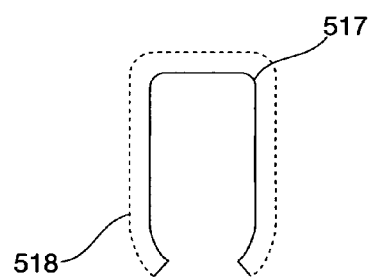

FIG. 29 shows a "C" shaped internal configuration 517 with arced and flat surfaces, inside receiver 518.

A flat internal surface is defined as being substantially smooth and level; and, an arced internal surface is defined as being curved, and may include a plurality of arcs forming a circle or an oval, or a part of a circle and/or an oval. A "C" shaped section is defined as a receiver having an inner configuration (when viewed from an end view) which resembles any form of the letter "C." A semi-flexible receiver is defined as a receiver that can bend to accept a lighting component without breaking. Certain materials such as ABS plastic for example are not only flexible, but maintain their inherent shape with a "living" force. Accordingly, a "C" shaped receiver made of ABS plastic or similar material, for example, can act as a living hinge clamp providing living force to detachably hold a lighting component (or part of a lighting component.) A "living" force is the force exerted from a first object (such as a flexible "C" shaped receiver) to another object (such as a flashlight) when the first object is deformed from its inherent shape and acting to recover its inherent form.

Although the internal configuration of a lighting component receiver can take almost any form, it's important that each receiver provide internal contact positions with a lighting component whereby the lighting component is consistently held firmly in place relative to the receiver. These contact positions between the inside of a lighting component receiver and a lighting component could be point-to-point; surface-to-surface; or, any combination thereof, for example.

Upon reading and understanding the specification of the present invention described above, modifications and alterations will become apparent to those skilled in the art. It is intended that all such modifications and alterations be included insofar as they come within the scope of the patent as claimed or the equivalence thereof.

What is claimed is:

1. A compact, portable lighting device having a support component and a plurality of lighting components, which comprises:

a) a support component having a plurality of lighting component receivers, each of said receivers having a back and a front, each of said receivers having a plurality of contacting positions to simultaneously contact and hold a lighting component, and each of said receivers having a focal point of said plurality of contact positions that is a straight central axis; and, b) said plurality of lighting components being separate components from said support component and separate components from one another, each of said plurality of lighting components having an elongated section with a straight central axis and a front end with illumination elements, each of said plurality of lighting components being positioned within one or more of said receivers with its straight central axis being coincidental with said straight central axis of said one or more receivers, and, wherein said central axes of said plurality of lighting components are nonparallel to one another and converge at a predetermined point of convergence when viewed from back to front;

wherein a user may remove and insert one or more of said plurality of lighting components from and to one or more of said receivers, and may illuminate each of said plurality of lighting components separately.

2. The portable lighting device having a support component and a plurality of lighting components of claim 1 wherein each receiver of said plurality of receivers is selected from the group consisting of: (i) a receiver having a plurality of internal flats; (ii) a receiver having a plurality of internal arcs; (iii) a receiver having a semi-flexible, elongated C-shaped section; and (iv) a receiver having an internal tubular shape.

3. The portable lighting device having a support component and a plurality of lighting components of claim 1 wherein said support component includes a handle.

4. The portable lighting device having a support component and a plurality of lighting components of claim 1 wherein said plurality of lighting components is two.

5. The portable lighting device having a support component and a plurality of lighting components of claim 1 wherein said plurality of lighting components is at least three.

6. The portable lighting device having a support component and a plurality of lighting components of claim 5 wherein said at least three lighting components are arranged in a predetermined pattern selected from the group consisting of parallel and polygonal.

7. The portable lighting device having a support component and a plurality of lighting components of claim 1 wherein said plurality of receivers include at least one adjustment mechanism whereby at least one of said receivers is moveable relative to another of said receivers to alter the point of convergence of said central axes of at least two of said plurality of lighting components.

8. The portable lighting device having a support component and a plurality of lighting components of claim 7 wherein there is a single controlling adjustment mechanism connected to at least three of said plurality receivers, and said at least three receivers are moveable simultaneously with the same rate and point of convergence of movement, relative to said support component, to alter the point of convergence of said central axes of at least three of said plurality of lighting components.

9. The portable lighting device having a support component and a plurality of lighting components of claim 8 wherein said single controlling adjustment mechanism includes a threaded adjustment wheel for manual rotation to alter the point of convergence.

10. A compact, portable lighting device having a support component and a plurality of lighting components, which comprises:
   a) a support component having a plurality of lighting component receivers, said support component having a back and a front, each of said receivers having a back and a front, each of said receivers having a plurality of contacting positions to simultaneously contact and hold a lighting component, and each of said receivers having a focal point of said plurality of contact positions that is a straight central axis, said support component having a maximum periphery when viewed from a back view thereof, said maximum periphery being a circle encompassing said support component and tangent to at least two outer points thereof, each of at least two of said plurality of lighting component receivers being positioned proximate to the other and to the circle of said maximum periphery of said support component; and,
   b) said plurality of lighting components being separate components from said support component and separate components from one another, each of said plurality of lighting components having an elongated section with a straight central axis and a front end with illumination elements, each of said plurality of lighting components being positioned within one or more of said receivers with its straight central axis being coincidental with said straight central axis of said one or more of said receivers, and, wherein said central axes of said plurality of lighting components are nonparallel to one another and converge at a predetermined point of convergence when viewed from back to front;

wherein a user may remove and insert one or more of said plurality of lighting components from and to one or more of said receivers, and may illuminate each of said plurality of lighting components separately.

11. The portable lighting device having a support component and a plurality of lighting components of claim 10 wherein each of said at least two lighting component receivers is positioned proximate to the other and tangent to the circle of said maximum periphery of said support component.

12. The portable lighting device having a support component and a plurality of lighting components of claim 10 wherein each receiver of said plurality of receivers is selected from the group consisting of: (i) a receiver having a plurality of internal flats; (ii) a receiver having a plurality of internal arcs; (iii) a receiver having a semi-flexible C-shaped section; and (iv) a receiver having an internal tubular shape.

13. The portable lighting device having a support component and a plurality of lighting components of claim 10 wherein said support component includes a handle.

14. A compact, portable lighting device having a support component and a plurality of lighting components, which comprises:
   a) a support component having a plurality of lighting component receivers, each of said receivers having a back and a front, each of said receivers having a plurality of contacting positions to simultaneously contact and hold a lighting component, and each of said receivers having a focal point of said plurality of contact positions that is a straight central axis; and,
   b) said plurality of lighting components being separate components from said support component and separate components from one another, each of said plurality of lighting components having an elongated section with a straight central axis and a front end with illumination elements, each of said plurality of lighting components being positioned within one or more of said receivers with its straight central axis being coincidental with said straight central axis of said one or more receivers; and, wherein said central axes of said plurality of lighting components are nonparallel to one another and converge at a predetermined point of convergence when viewed from back to front;

c.) said plurality of receivers including at least one adjustment mechanism whereby at least one of said receivers is moveable relative to another of said receivers to alter the point of convergence of said central axes of at least two of said plurality of lighting components;

wherein a user may remove and insert one or more of said plurality of lighting components from and to one or more of said receivers, and may illuminate each of said plurality of lighting components separately.

15. The portable lighting device having a support component and a plurality of lighting components of claim 14 wherein there is a single controlling adjustment mechanism to alter the point of convergence of the central axes of at least two of said plurality of lighting components.

16. The portable lighting device having a support component and a plurality of lighting components of claim 14 wherein each receiver of said plurality of receivers is selected from the group consisting of: (i) a receiver having a plurality of internal flats; (ii) a receiver having a plurality of internal arcs; (iii) a receiver having a semi-flexible, elongated C-shaped section; and (iv) a receiver having an internal tubular shape.

17. The portable lighting device having a support component and a plurality of lighting components of claim 14 wherein said support component includes a handle.

18. The portable lighting device having a support component and a plurality of lighting components of claim 14 wherein said plurality of lighting components is two.

19. The portable lighting device having a support component and a plurality of lighting components of claim 14 wherein said plurality of lighting components is at least three.

20. The portable lighting device having a support component and a plurality of lighting components of claim 15 wherein said single controlling adjustment mechanism includes a threaded adjustment wheel for manual rotation to alter the point of convergence.

* * * * *